May 2, 1967  R. W. SCHUMANN  3,317,717
CIRCUITRY TO REPRESENT AS A WAVEFORM THE RELATIONSHIP
OF TWO VARIABLES
Filed May 22, 1964
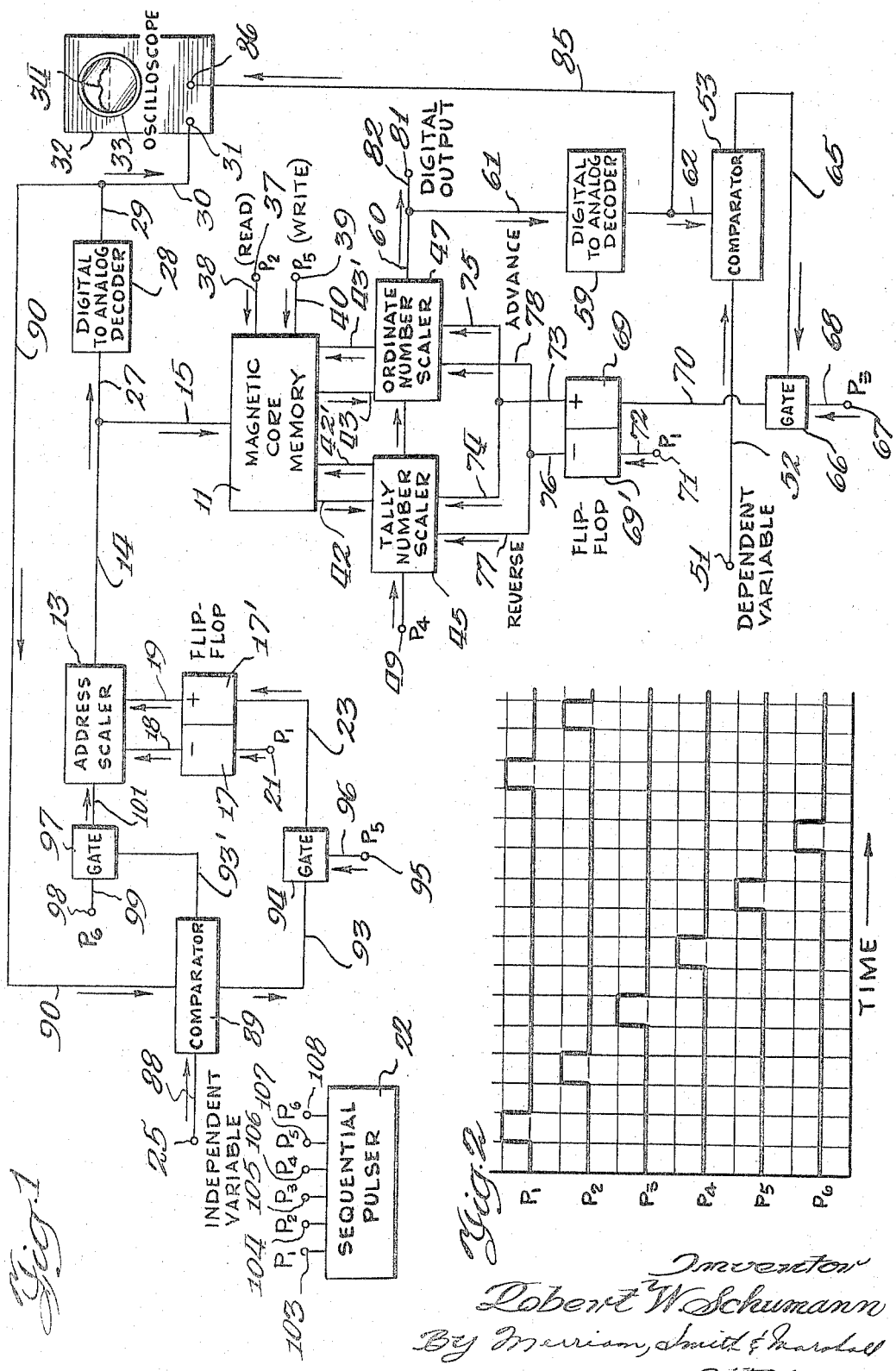

3,317,717
CIRCUITRY TO REPRESENT AS A WAVEFORM THE RELATIONSHIP OF TWO VARIABLES
Robert W. Schumann, Madison, Wis., assignor to Northern Scientific Inc., Madison, Wis., a corporation of Wisconsin
Filed May 22, 1964, Ser. No. 369,429
4 Claims. (Cl. 235—150)

This invention relates to circuitry for determining and representing the magnitude relationship of two variables. In the preferred operation of the circuit, a comparison is made between the two variables in order to provide representations which, due to control exercised by the operation of the apparatus, may be displayed in any desired fashion.

In the measurement of a physical variable which is dependent upon a second variable, it is frequently necessary to obtain digital representations of the dependent variable in order to analyze or study the variable relationships in detail. There are various known devices for so digitizing the signal. One well-known method is to control the independent variable and set it at some desired value and then simply measure the dependent variable by using a digital voltmeter. It is also a common practice to record the digitial results of such measurements in a computer memory, assigning one memory address to each measurement, and making a separate measurement for each independent variable value of interest. Such recordings need not be made in a computer memory, but they frequently are, and later reference will be made to such a situation.

Many variables are dependent upon time. In such cases the independent variable is time. What makes this case of unusual interest is that the recording and digitizing processes are sometimes most hasty, for the experimenter cannot at his convenience hold the independent variable steady while measuring the dependent variable in a case where the independent variable is time. But this is not the only circumstance in which the experimenter experiences difficulties associated with rapid measurements. Sometimes the independent variable may not be time, but, for example, may be temperature or velocity and completely beyond the control of the experimenter. It may attain various values for such short times as to make very rapid measurements mandatory.

There are still other classical problems involved in measuring the digital magnitudes of a dependent variable. Sometimes that variable cannot be sensed without involvement with noise. Such noise is often severe, and almost prevents accurate measurement. A digital voltmeter of ordinary form can rarely be used for such a condition except where an abundance of time is available. A similar problem exists, strangely enough, where the dependent variable can be readily enough measured, but determinations of the independent variable may be uncertain due to noise or other obscuring signals unrelated to either variable.

Various methods and apparatus have been developed and proposed in the past which to some degree aid in resolving both the problem of exceedingly rapid measurements and reducing the effect of noise.

The prior art devices generally have one or another shortcoming. They are generally designed to measure signals which vary with time. In most cases, the prior art proposals are based upon a premise that the dependent variable is measured at regular time intervals. These prior art proposals are not, therefore, capable of making similar measurements if the independent variable is other than time, or if the independent variable changes in an unpredictable or otherwise inconvenient fashion. The two methods cited above, furthermore, have the common characteristic that in reducing noise, the totals of the signal magnitudes observed repeatedly for each value of the independent variable are recorded. These totals are in themselves not representative of the signal magnitudes. In order to obtain the time values, the totals must be divided by the number of signal measurements which were made. This means that a separate record must be kept of the number of measurements of the dependent variable. Furthermore, it becomes important that a like number of measurements must be made for each independent variable magnitude of interest. There are other important disadvantages involved in the foregoing and other methods, including cost and information ambiguities that result when the totals involved exceed in magnitude the storage capabilities of the memory media involved. Still further, such devices are relatively limited in speed.

In accordance with the present invention, the circuitry to be described provides that measurement of the dependent variable may be made indefinitely often for each value of the independent variable without altering the final value except insofar as the final value tends to become increasingly more accurately representative of the non-noise component of the input signal which represents, in turn, the dependent variable of interest. Aside from the important practical advantage gained that the recorded numbers ultimately indicate absolute rather than relative values, it becomes practical to devise means for adopting the device to the measurement of dependent variables which are dependent upon irregularly changing independent variables. Such means are a part of this invention.

While the present invention is well suited to the measurement of signals involved with noise, it is by no means limited thereto. As will be seen the present invention is also particularly well suited to the measurement of signals involving no noise. It is less complex and expensive than comparably accurate earlier systems, and it is capable of accepting, in unmodified form, two voltages (for example) directly representative of both the dependent and independent variable. Still further, the circuit of the present invention automatically programs itself to obtain measurements of the dependent variable for each of a large number of values of the independent variable.

Aside from its fundamental advantages relating to its capability of measuring rapidly varying signals with comparatively simple circuits, its capability of making unambiguous and absolute measurements whether or not noise is involved, and its capability of making measurements wherein the independent variable is not changing in controlled or linear or predictable fashion, the apparatus and circuitry of the present invention has the important advantage of versatility and can accomplish all of the foregoing objectives without appreciable alteration.

In earlier existing noise-reducing apparatus, such as described above, the broad principle involved is that if the signal magnitude of a time-varying recurrent signal is measured at preselected intervals, and at the same intervals for each signal, and if the magnitudes observed at each point are added to those observed for the corresponding points of successive signal occurrences, the totals reflect the magnitudes of the fixed non-noise components of the signal because those fixed components contribute consistently to the totals whereas the noise adds randomly. The method very effectively reduces noise errors. The results are totals, however, not absolute values.

In the present invention, the signal during the existence of a particular value of the independent variable is observed and compared with a number recorded in a memory address assigned to that particular magnitude of the independent variable. If the recorded number is the smaller, then that recorded number is appropriately revised, in some cases. It is important, however, to note that it is not always revised. In one embodiment of this invention, the recorded number is revised to a small extent after a specified number of occasions in which the recorded number was observed to be too small or too large. A persistent error between the recorded number and the input signal will result in a change because it is reasonably certain that such a change is appropriate after repeated indicated errors. The result is a gradual approach to whatever value corresponds to the fixed component of the signal magnitude. There may be chance fluctuations due to unfortunate chance occurrences of comparatively persistent noise preponderantly in one direction, but particularly if the noise is random, such fluctuations can easily be made small and rare in occurrence, by insisting upon highly persistent error indications predominantly in one direction before making even small alterations in the recorded number.

In this invention means are provided to approach approximate final values quickly, by initially making substantial changes in the recorded numbers after only a few occasions in which the recorded number is observed to disagree with the input signal during the intervals. This rapid approximation makes it possible to arrive at final values after only a few comparsons for each recorded number, if there is no noise, and even where noise is involved, less time is required in a measurement than where the initial, probably very large, errors are only slowly corrected.

In this invention it will be seen that the independent variable will be treated as not time dependent; the apparatus includes a memory which is selectively addressed according to the magnitude of the applied independent variable.

This invention, as will be appreciated from the description to follow, provides for making frequent and typically periodic comparisons between the signal and recorded number. If the independent variable changes, comparisons with that particular number and the dependent variable are discontinued, and without interruption (typically) comparisons between the dependent variable and a different recorded number are made, the different recorded number being that which is assigned to the dependent variable when the independent variable has its new value.

There are a generally large number of recorded numbers which will frequently be referred to as ordinate numbers. Each of these is assigned to a separate coordinate point with one such coordinate point representing each magnitude of interest of the independent variable. As stated, the periodic comparisons are always comparisons between the ordinate number associated with the then existing independent variable magnitude. Each ordinate number is usually associated with a definite magnitude range, rather than a discrete magnitude value, of the independent variable.

The ordinate numbers, in one embodiment of this invention, are recorded in a digital memory. This memory is addressed according to the existing independent variable. Whenever that variable changes, the comparison and ordinate number alteration then in process is allowed to be completed, the ordinate number then being processed is restored to the memory, and the new ordinate number associated with the new independent variable magnitude is extracted from the memory and operated upon.

Associated with each ordinate number in the circuitry described herein is another number called the tally number. In a manner to be described this tally number is altered according to the outcome of each comparison of the associated ordinate number and the existing dependent variable magnitude. The function of the tally number is to keep an account of the relative frequency of comparisons indicating the ordinate number to be too high and the frequency of comparisons indicating otherwise. When there is a predetermined preponderance of "too high" or "too low" comparisons, the associated ordinate number is corrected by a certain amount.

While in a preferred embodiment of the invention the use of the tally number will be set forth, it should be understood that necessarily there may be no tally number involved. This would be specifically the case where if no noise is present the use of the tally number is entirely unnecessary for completely efficient operation. Furthermore, the tally may be altered to reflect the degree of difference observed or merely the fact that there was a difference.

Generally speaking, the frequency with which comparisons are made is high, a million times per second being a reasonable rate in some circumstances. In other circumstances the rate may be lower.

Where the independent variable is time, ordinate numbers may be extracted from the memory sequentially, along with the assigned tally numbers. Otherwise the extractions may be irregular. As stated, before a different ordinate number is extracted, the ordinate number which has just previously been involved is restored to its assigned memory location.

This process suggests that necessarily there need be no particular requirement that the complete formation of the final correct value of any ordinate number be established before restoring the partially processed ordinate number to the memory. It is assumed that where time does not allow the completion of the processing before a new independent variable magnitude is observed to exist, there will be a later opportunity to further process the number.

It is, in fact, an important characteristic of the circuit and apparatus of this invention that this is possible. Any digitizing process takes time, especially where high precision is required. If digitizing were not completed piecemeal, more time would be required than sometimes available. A piecemeal process permits digitizing of signals which may be direct or indirect functions of time. Where the signal or independent variable changes rapidly any system in which complete digitizing in one series of consecutive operations is involved is likely to be several times as slow as the present system in the sense that the signal being digitized must remain steady for a longer period, while in the present system it need remain steady for short periods providing that later opportunities exist to continue the process.

The described circuitry offers advantages over prior art in which complete digitizing is disadvantageous in that in some circuitry heretofore used it is not possible to digitize rapidly changing signals because at each time interval of interest a multi-step complete digitizing process is involved. Although faster and faster complete digitizers can be expected to be available, it is reasonable to believe that they will probably always be slower than if partial digitizing such as herein described is used. Complete digitizers for all conditions can surely be expected to be more expensive and complex.

It is to be observed that in earlier digitizing devices each digitizing operation is followed by the recording of information into the digital memory, with the recorded information generally or at least on the average directly related to the then observed signal magnitude. There is no comparison between the existing signal and previously recorded signal information. In the present invention, alteration of the previously recorded numbers depends not only upon the existing signal magnitude but also upon the magnitude of the previously recorded numerical information. This is a basic and significant difference. In some prior art proposals the selection of which ordinate number is next to be operated upon is based upon a definite time sequence, whereas in most cases in the present invention the selection may be unrelated to time in the sense of being unpredictable in advance. The selection depends upon the magnitude of the then existing independent variable.

While references have been made in what has been stated to dependent and independent variables, it is important that such references should not be considered restrictive, but, to the contrary, to have been proposed for convenience in exposition and an understanding of the operation. The main purpose of the circuitry proposed is for use in determining the magnitudes of two related physical variables and it is not of importance in general which is presumed to be independent and which dependent in the sense of cause and effect. The variable referred to herein as independent is utilized to select particular ordinate numbers and the dependent variable is the variable whose magnitude is ultimately represented by the magnitudes of the ordinate numbers.

In a preferred form of the invention, the timing operation is generally based upon the use of a sequential pulser. The pulser is designed to produce in sequence, at a plurality of output points, time-separated operational control pulses which sequentially shift from one to another of the several output points. Upon reaching the last of a selected group of output pulses, the sequence repeats. This repetition is continuous and the developed pulses, as will be made apparent, serve to control different portions of the operation so that different components operate in carefully timed sequence relative to each other.

There is also included an address scaler. This component has a first output which controls a magnetic core memory and a second output which supplies signals to a digital-to-analog decoder. The decoder output is compared with the independent variable input signal and, at appropriate times, its state of operation is readjusted to produce agreement between its output and the independent variable signal output. This provides a control of the memory address according to the magnitude of the independent variable.

A two-part incremental binary scaler is connected to receive ordinate numbers and tally numbers from the memory. The scaler, as it will be described, is a unit which can be stepped one unit forward (an advance) or one unit backward (a reverse) in state, according to the results of comparisons between the magnitude of a dependent variable and the state of the ordinate number position of this scaler.

The incremental binary scaler also controls the process of "writing" information back into the magnetic core memory. As will be described, the tally number portion of the scaler produces no output except that required to control the memory and to provide an overflow signal which serves to control the ordinate number position of the scaler when it occurs. The ordinate number portion of the scaler provides digital signal outputs to a second digital-to-analog decoder whose output signal is used in making comparisons with a dependent variable input signal supplied to the system, as well as to provide a control over the display in any suitable fashion of the dependent variable. For comparing the output of the digital-to-analog decoder with the dependent variable, these signals are supplied to a comparator of any desired character whose output is arranged to control, through suitable gating if desired, a flip-flop circuit which, in turn, controls the incremental scaler which contains the tally number and the ordinate number.

The outputs from the two digital-to-analog decoders provide signals of suitable voltage which present output representations in suitable form for determination, and in one form the two analog outputs may be used to control the horizontal and vertical deflection of a cathode-ray beam on the target of a cathode-ray tube within a suitable oscilloscope device. Under such control, the address scaler and the ordinate number scaler so control the observable indication that the cathode-ray beam which is observed as it impacts the screen target is deflected to a definite point on the fluorescent target of the ordinate numbers for each value of the address scaler. It is, of course, apparent that other forms of making the signal relationship apparent may be utilized, but for the purpose of this explanation the oscilloscope device will be discussed.

The invention has been illustrated in one of its preferred forms by the accompanying drawings. In the drawings, FIG. 1 illustrates diagrammatically and schematically the relationship between the several components of which the invention is comprised, and FIG. 2 illustrates a series of controlling pulses adapted to be generated in any suitable fashion from a controlling sequential pulser and arranged to repeat in an orderly sequence.

If reference is now made to the drawings for further understanding of the invention, consideration first may be given to the schematically designated magnetic core memory 11. This memory unit may be of any desired type and need not be specifically shown. It normally is in the form of a component capable of magnetically storing information which may later be retrieved for display, as desired. In one illustration it might be assumed that the magnetic core memory device has, for instance, sixteen subject addresses and, illustratively, a word length of ten bits. The operation of the memory circuit is determined by the information supplied to it by an appropriate address, schematically shown as scaler 13. The address scaler may be any type of binary scaling device whose output is supplied by way of conductors 14 and 15 as one input to the memory unit.

At this point in the discussion, no specific control sequence will be discussed but this will follow later to show the output functioning of the several components. The address scaler is controlled by the operation of a conventionally represented flip-flop circuit, schematically shown at 17 and 17', with the portion 17 supplying its output via the conductor 18 to control the address scaler in, say, a reverse direction and the portion 17' supplying the address scaler by way of conductor 19 to control the address scaler in a forward or advance direction. The flip-flop section 17 is controlled by an input pulse $P_1$, later to be discussed more fully, supplied at the input terminal 21 from terminal 103 of a suitable sequential pulser, schematically represented as 22, also later to be described. Operation of the flip-flop in its other direction is through a control of the section 17'. The flip-flop is the usual bistable multivibrator. The control of portion 17' is established by way of a conductor 23 energized in a fashion later to be explained. It may be assumed at this point in the discussion that the address scaler 13 is caused to respond initially to the application of a train of signal energy supplied at terminal 25 which, for an understanding of the operation, may be regarded as the independent variable under consideration.

The address scaler 13 provides a digital output series of pulses which control the addressing of the magnetic core memory unit 11, the addressing occurring according to well-known principles. The scaler 13 also supplies digital output pulses via conductors 14 and 27 to a conventional type of digital-to-analog decoder, schematically represented at 28. The signal pulses in analog form which are derived at the output at decoder 28 in well-known fashion are supplied by way of conductors 29 and 30, respectively, to an input terminal 31 of an oscilloscope unit, schematically represented at 32. This signal serves to provide a control of the horizontal positioning of a cathode-ray scanning beam within the oscilloscope display tube, schematically shown at 33, in order to provide a wave trace, illustratively shown at 34.

Information may be "read" into the magnetic core memory 11 at appropriately selected time periods by supplying a control pulse $P_2$ from terminal 104 to the sequential pulser 22 to the terminal point 37. This pulse is fed into the memory by way of a conductor 38. Information is "written" in the memory at appropriately controlled time periods under the triggering of a "write" pulse $P_5$ supplied at the terminal 39 from terminal 106 of pulser 22 and thence through the conductor 40 to the memory unit.

Information from the memory unit is supplied by way of conductors 42 and 43 to a tally number scaler 45 and an ordinate number scaler 47. The scalers 45 and 47 are each of the usual binary type of scaler components, which of themselves are well known and need not be discussed in any further detail. The tally number scaler 45 is controlled in its operation both in accordance with the control provided by one of the sequential pulses $P_4$ (produced as above noted) available at terminal 49 from terminal 106 of the pulses 22 and also by the effect of the applied dependent variable signal available at the terminal 51 and supplied by way of conductor 52 which connects as one input to a comparator 53. Similar conditions obtain with respect to the ordinate number scaler 47 and, as can be seen from FIG. 1 of the drawings, each of the tally number scaler 45 and the ordinate number scaler 47 is supplied with a controlling signal from the magnetic core memory 11 with operation of the tally number scaler 45 controlled by the timing pulse $P_4$ available at the input terminal 49 and by way of the output of comparator 53 supplied in the fashion indicated.

Considering more specifically the operation, the dependent variable supplied at the terminal 51 by way of conductor 52 to comparator 53 is there compared with a controlling voltage in the form of an analog signal developed in a digital-to-analog decoder 59, which receives its input by way of conductors 60 and 61 from the digital output of the ordinate scaler 47. The comparator 53 is any desired type of comparison unit of well-known character which is adapted to compare the instantaneously supplied dependent variable signal available on conductor 52 with the analog output of the decoder 59. The analog output from decoder 59 is supplied by way of conductor 62 to the comparator. At such times as there is a departure between the analog signal output of decoder 59, which represents the stored digital information instantaneously present in the scaler 47, and the incoming dependent variable available on conductor 52, an output signal is derived from the comparator 53 and made available on conductor 65. The pulses or voltages on conductor 65 are supplied to a gate 66 whose operational periods are controlled by a control pulse $P_3$ from terminal 105 of the pulser 22 and applied to the terminal point 67 and through conductor 68 to the gate 66.

If there is a difference between the analog signals available in the comparator 53 as supplied by the conductors 62 and 52, then the circuit is such that a voltage of sufficient magnitude appears on conductor 65 to trip the flip-flop 69, 69' when the gate 66 is opened to pass the signal along to conductor 70. The flip-flop 69 is generally in the nature of a so-called bistable multivibrator with one side thereof receiving control pulses from the conductors 70 and the other side thereof being controlled by the successive pulses $P_1$ (from terminal 103) available at the terminal point 71 which becomes available as an opening pulse on the conductor 72 which is connected into the flip-flop 69. The output from the flip-flop 69 (right-hand half) or 69' (left-hand half) supplies either a pulse to trigger the tally number scaler 45 and the ordinate number scaler 47 in a forward or advance direction at times when pulses are available on conductor 73. Such control pulses are supplied to the scalers 45 and 47 by way of conductors 74 and 75, or, in the event that a reverse pulse is developed and available at the output of the conductor 76, to the flip-flop 69', then a reverse pulse is supplied by way of conductors 77 and 78 to the scalers 45 and 47. This type of comparison and the achievement of a measure of the instantaneous departure of the dependent variable from the analog of the stored number available in scaler 47 at selectable time periods, then provides a control over the scalers whereby the scalers either tend to increase or decrease whatever digital information is available in the scaler elements. A control pulse is then fed into the magnetic core memory by way of conductors 42' and 43' respectively. The digital output from the scaler 47 is not only supplied to the decoder 59 but also to terminal point 81 through conductor 82 which connects to the output conductor 60 from the ordinate number scaler 47. The output represents the actual digital representation of the scaler 47. Since the oscilloscope 32 is to represent analog information of the scaler output, the analog information from the digital-to-analog decoder 59 is supplied not only to the comparator 53 but also is supplied by way of conductor 85 to constitute a second input available at terminal 86 for controlling the ordinate position of any trace provided on the oscilloscope veiwing tube. Thus the trace 34 produced by the cathode-ray beam in tube 33 has its horizontal positioning controlled by the address scaler (the independent variable-controlled signal) and the ordinate number scaler (the dependent variable-controlled signal).

Reference may now be made to the further control of the address scaler. This component is controlled both by the independent variable supplied at the input terminal 25 and thence through conductor 88 to a comparator 89 and the decoded output of the digital-to-analog decoder 28 used to control the lateral movement of the trace of the viewing tube 33. The analog information available on conductor 29 is also supplied by way of conductor 90 to the comparator 89 and there compared with the independent variable supplied by way of conductor 88.

The resulting output signal is then made available in two positions of the comparator 89 and appears upon conductors 93 and 93'. One of the outputs on conductor 93 is supplied to a gate 94 whose operation is timed by a control pulse $P_5$ available at the terminal 95 from terminal 107 and supplied to the gate through conductor 96. The gate 94 then supplies control signals to the flip-flop 17' by way of conductor 23. The second output from the comparator 89 is supplied by way of conductor 93' to a gate 97 whose operation is controlled by a control pulse $P_6$ available from terminal 108 of the pulser 22 to the terminal 98. The pulse control is supplied by conductor 99 through the gate and thence activates or exercises a supplemental control upon the address scaler 13 through conductor 101.

It will be noted at this point that the comparator 89 differs to a minor extent from the comparator 53 in that the former comparator 89 supplies its output not only through a gate, such as 94, to control the operation of flip-flop circuits, but also the output is supplied through an output conductor 93' to a second gate 97 and opens latter gate to the address scaler 13. This circuit control serves to prevent changes being introduced into the address scaler, unless an appreciable disagreement exists in the signal voltage available to represent the independent variable and supplied by conductor 88 and the analog voltage available on conductor 90. The gate 97, accordingly, may be any well-known and ordinary logic-type gate which opens at such time as the disagreement between the independent variable at terminal 25 and the analog information on conductor 90 approaches the desired response-change condition.

From the foregoing, it is apparent that the address scaler 13 is controlled under the influence of the supplied independent variable and that the tally number scaler 45 and the ordinate number scaler 47 are concurrently controlled under the influence of the dependent variable signal supplied at the terminal point 51.

The timing of the operation of all of the components herein above identified is controlled by signal pulses derived from a sequential pulser of any known character whose output is diagrammatically represented by the pulse series $P_1$ through $P_6$ in FIG. 2. The sequential pulser is driven to operate continuously and its developed output pulses $P_1$ through $P_6$ become available at the terminal points 103 through 108, inclusive, of the signal pulser 22.

In the illustrated example the relative timing of pulses $P_1$ through $P_6$ is particularly exemplified by the curve of FIG. 2. Suffice it therefore to say at this point that flip-flops 17 and 17', on the one hand, and 69 and 69', on the other hand, have their left-hand section controlled and opened or triggered by the $P_1$ pulse generated and available at the terminal 103. The $P_2$ pulse serves to control the "read" condition within the magnetic core memory 11. The $P_3$ pulse available at the terminal 105 is that control pulse which times the operation and opening of the gate 66 to provide the response and control of the flip-flops 69 and 69' to the control of the dependent variable available at the input terminal 51. The $P_4$ pulse developed serves to trigger the tally number scaler 45 prior to the time pulses $P_5$ triggers the "writing" condition within the magnetic core memory 11. Pulse $P_5$ serves to control the opening of gate 94, thereby to control the address scaler 13 under the influence of the supplied independent variable made available at terminal 25. Lastly, the pulse $P_6$ serves to determine the operation in its control of the address scaler 13.

Following the completion of one cycle of the operation, during which all of the pulses $P_1$ through $P_6$ are developed, the pulse $P_6$, as can be seen from FIG. 2, is then followed in the same carefully timed sequence relationship by the next succeeding pulse $P_1$.

Various modifications of the invention, of course, may be made while falling fully within the spirit and scope of what has been here disclosed. The description herein given thus is to be regarded as illustrative and not limiting and is presented to provide a full and clear understanding of one preferred form which the information may assume.

Having now described the invention, what is claimed is:

1. A circuit for determining and registering the magnitude relationship of two variable signals in the form of a dependent variable and an independent variable by determining for each of a predetermined number of magnitude values of the independent variable the approximate magnitude of the dependent variable, comprising
   a memory circuit controlled by the magnitude of the independent variable and including means for separately recording therein numerical representations corresponding to each of the predetermined number of magnitude values of the independent variable,
   means for selectively extracting from said memory circuit the numerical representation of the independent variable magnitude value at related time, said selectively extracting means restoring the extracted numerical representation upon a change in magnitude value of the independent variable,
   means for deriving an analog signal functionally related to the selectively extracted numerical representation,
   means for comparing the derived analog signal with the magnitude of the dependent variable at a time related to the time that the numerical representation is extracted from said memory circuit,
   tally means for maintaining a tally of the number of times that the comparisons made by said comparing means indicates that the dependent variable exceeds the magnitude of the derived analog signal with which it is compared diminished by the number of times that the comparisons indicate otherwise,
   means for providing a separate tally for each independent variable magnitude value,
   means for altering the extracted numerical representation in a first direction when the associated tally exceeds a first predetermined value,
   said means altering the extracted numerical representation in a second direction when the associated tally decreases below a second predetermined value,
   means for reducing said associated tally to zero upon alteration of the extracted numerical representation, and
   means for registering said numerical representation.

2. A circuit for determining and registering the magnitude relationship of two variable signals in the form of a dependent variable and an independent variable by determining for each of a predetermined number of magnitude values of the independent variable the approximate magnitude of the dependent variable, comprising
   address scaling means having a discrete output relating to each of the predetermined number of magnitude values of the independent variable,
   a digital memory circuit including means for separately recording therein a numerical digital representation corresponding to each discrete output from said scaling means,
   means for selectively extracting from said memory circuit the numerical representation corresponding to the output of said address scaling means at related times,
   said selectively extracting means restoring the extracted numerical representation upon a change in the output of said address scaling means,
   means for deriving an analog signal functionally related to the selectively extracted numerical representation,
   means for comparing the derived analog signal with the magnitude of the dependent variable at a time related to the time that the numerical representation is extracted from said memory circuit,
   tally means for maintaining a tally of the number of times that the comparisons made by said comparing means indicates that the dependent variable exceeds the magnitude of the derived analog signal with which it is compared diminished by the number of times that the comparisons indicate otherwise,
   means for providing a separate tally for each independent variable magnitude value,
   means for altering the extracted numerical representation in a first direction when the associated tally exceeds a first predetermined value,
   said means altering the extracted numerical representation in a second direction when the associated tally decreases below a second predetermined value,
   means for reducing said associated tally to zero upon alteration of the extracted numerical representation, and
   means for registering said numerical representation.

3. A circuit for determining and registering the magnitude relationship of two variable signals in the form of a dependent variable and an independent variable by determining for each of a predetermined number of magnitude values of the independent variable the approximate magnitude of the dependent variable, comprising
   an ordinate memory circuit controlled by the magnitude of the independent variable and including means for separately recording therein numerical representations corresponding to each of the predetermined number of magnitude values of the independent variable,
   first means for selectively extracting from said ordinate memory circuit the numerical representation of the independent variable magnitude value at related times,
   said first selectively extracting means restoring the extracted numerical representation upon a change in magnitude value of the independent variable,
   means for deriving an analog signal functionally related to the selectively extracted numerical representation,
   means for comparing the derived analog signal with the magnitude of the dependent variable at a time related to the time that the numerical representation is extracted from said memory circuit, a tally memory circuit for separately recording therein for each independent variable magnitude value a tally of the number of times that the comparisons made by said comparing means indicates that the dependent variable exceeds the magnitude of the derived analog signal with which it is compared diminished by the number of times that the comparisons indicate otherwise, second means for selectively extracting from said tally memory circuit the tally recorded therein at a time related to the time that the numerical representation is extracted from said ordinate memory circuit, said second selectively extracting means restoring the extracted tally at a time related to the restoration of the extracted numerical representation, means for altering the extracted numerical representation in a first direction when the associated extracted tally exceeds a first predetermined value, said means altering the extracted numerical representation in a second direction when the associated extracted tally decreases below a second predetermined value, means for reducing said associated extracted tally to zero upon alteration of the extracted numerical representation, and means for registering said numerical representation.

4. A circuit for determining and registering the magnitude relationship of two variable signals in the form of a dependent variable and an independent variable by determining for each of a predetermined number of magnitude values of the independent variable the approximate magnitude of the dependent variable, comprising address scaling means having a predetermined number of consecutive discrete digital output values, comparator means connected to said address scaling means for receiving the independent variable as a first input and having a second input, an excess of said first input over said second input beyond a first predetermined value altering the output value from said address scaling means by a first amount in a first direction, an excess of said second input over said first input beyond the first predetermined value altering the output value from said address scaling means by a first amount in a second direction, an excess of said first input over said second input beyond a second predetermined value altering the output value from said address scaling means by a second amount in the first direction, an excess of said second input over said first input beyond the second predetermined value altering the output value from said address scaling means by the second amount in the second direction, digital-to-analog decoding means for receiving the output from said address scaling means and supplying its analog output as the second input to said comparator means, a digital memory circuit including means for separately recording therein a numerical digital representation corresponding to each discrete digital output value from said scaling means, means for selectively extracting from said memory circuit the numerical representation corresponding to the output of said address scaling means at related times, said selectively extracting means restoring the extracted numerical representation upon a change in the output of said address scaling means, means for deriving an analog signal functional related to the selectively extracted numerical representation, means for comparing the derived analog signal with the magnitude of the dependent variable at a time related to the time that the numerical representation is extracted from said memory circuit, tally means for maintaining a tally of the number of times that the comparisons made by said comparing means indicates that the dependent variable exceeds the magnitude of the derived analog signal with which it is compared diminished by the number of times that the comparisons indicate otherwise, means for providing a separate tally for each independent variable magnitude value, means for altering the extracted numerical representation in a first direction when the associated tally decreases below a second predetermined value, means for reducing said associated tally to zero upon alteration of the extracted numerical representation, and means for registering said numerical representation.

References Cited by the Examiner
UNITED STATES PATENTS 3,182,181    5/1964    Schumann     235—164
3,209,327    9/1965    Brandt     340—146.1

MALCOLM A. MORRISON, *Primary Examiner.*

ROBERT C. BAILEY, M. A. LERNER, M. P. HARTMAN, *Assistant Examiners.*

UNITED STATES PATENT OFFICE
CERTIFICATE OF CORRECTION

Patent No. 3,317,717                                              May 2, 1967

Robert W. Schumann

It is hereby certified that error appears in the above numbered patent requiring correction and that the said Letters Patent should read as corrected below.

In the heading to the printed specification, lines 4 to 6, for "assignor to Northern Scientific Inc., Madison, Wis., a corporation of Wisconsin" read -- assignor, by mesne assignments, to Northern Scientific Inc., Austin, Tex., a corporation of Texas --; column 3, line 28, for "comparsons" read -- comparisons --; column 7, lines 37 and 38, for "available on conductor 52" read -- (available on conductor 52) --; column 8, line 10, for "The" read -- This --; column 9, line 19, for "pulses" read -- pulse --; column 12, line 20, for "functional" read -- functionally --.

Signed and sealed this 21st day of November 1967.

(SEAL)
Attest:

EDWARD M. FLETCHER, JR.
Attesting Officer

EDWARD J. BRENNER
                                                                     Commissioner of Patents